(12) United States Patent
Huang et al.

(10) Patent No.: US 12,276,796 B2
(45) Date of Patent: Apr. 15, 2025

(54) LIGHT FIELD DIRECTIONAL BACKLIGHTING BASED THREE-DIMENSIONAL (3D) PUPIL STEERING

(71) Applicant: Meta Platforms Technologies, LLC, Menlo Park, CA (US)

(72) Inventors: Hekun Huang, Redmond, WA (US); Xuan Wang, Kirkland, WA (US); Sascha Hallstein, Saratoga, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 111 days.

(21) Appl. No.: 18/073,823

(22) Filed: Dec. 2, 2022

(65) Prior Publication Data
US 2024/0061246 A1 Feb. 22, 2024

Related U.S. Application Data

(60) Provisional application No. 63/398,384, filed on Aug. 16, 2022.

(51) Int. Cl.
*G02B 27/01* (2006.01)
*G02B 3/00* (2006.01)
*G02B 27/00* (2006.01)

(52) U.S. Cl.
CPC ....... *G02B 27/0172* (2013.01); *G02B 3/0043* (2013.01); *G02B 3/0068* (2013.01); *G02B 27/0093* (2013.01); *G02B 2027/0174* (2013.01)

(58) Field of Classification Search
None
See application file for complete search history.

(56) References Cited

U.S. PATENT DOCUMENTS

| | | | |
|---|---|---|---|
| 9,269,330 B2 | 2/2016 | Yang | |
| 10,712,576 B1 | 7/2020 | McEldowney | |
| 11,086,129 B2 | 8/2021 | Hudman | |
| 11,194,167 B2 | 12/2021 | Lanman et al. | |
| 2012/0307181 A1 | 12/2012 | Fang | |
| 2013/0285885 A1* | 10/2013 | Nowatzyk | H01L 25/0753 345/8 |
| 2017/0269367 A1* | 9/2017 | Qin | G06F 1/163 |
| 2019/0258063 A1* | 8/2019 | Hudman | G02F 1/1336 |
| 2023/0421750 A1* | 12/2023 | Ito | G09G 3/20 |

* cited by examiner

*Primary Examiner* — Nicholas J Lee
(74) *Attorney, Agent, or Firm* — Mannava & Kang, P.C.

(57) ABSTRACT

A head-mounted display device employs light field directional backlighting to provide three-dimensional (3D) pupil steering without mechanical adjustment while maintaining a compact form factor and performance. An example light field directional backlighting unit includes two substantially flat components: an array of light sources and an array of modulators (e.g., a micro lens array (MLA), a stack of transmissive display elements, a pinhole array, and similar ones). By digitally modifying the illumination pattern on the array of light source and pairing to the light field directional backlighting unit to an extra transmissive display element as the main display panel and one or more viewing optical elements, a light field created by the light field directional backlighting unit is moved in three-dimensional (3D) space to correspond to pupil shift without interfering with the display content.

20 Claims, 11 Drawing Sheets

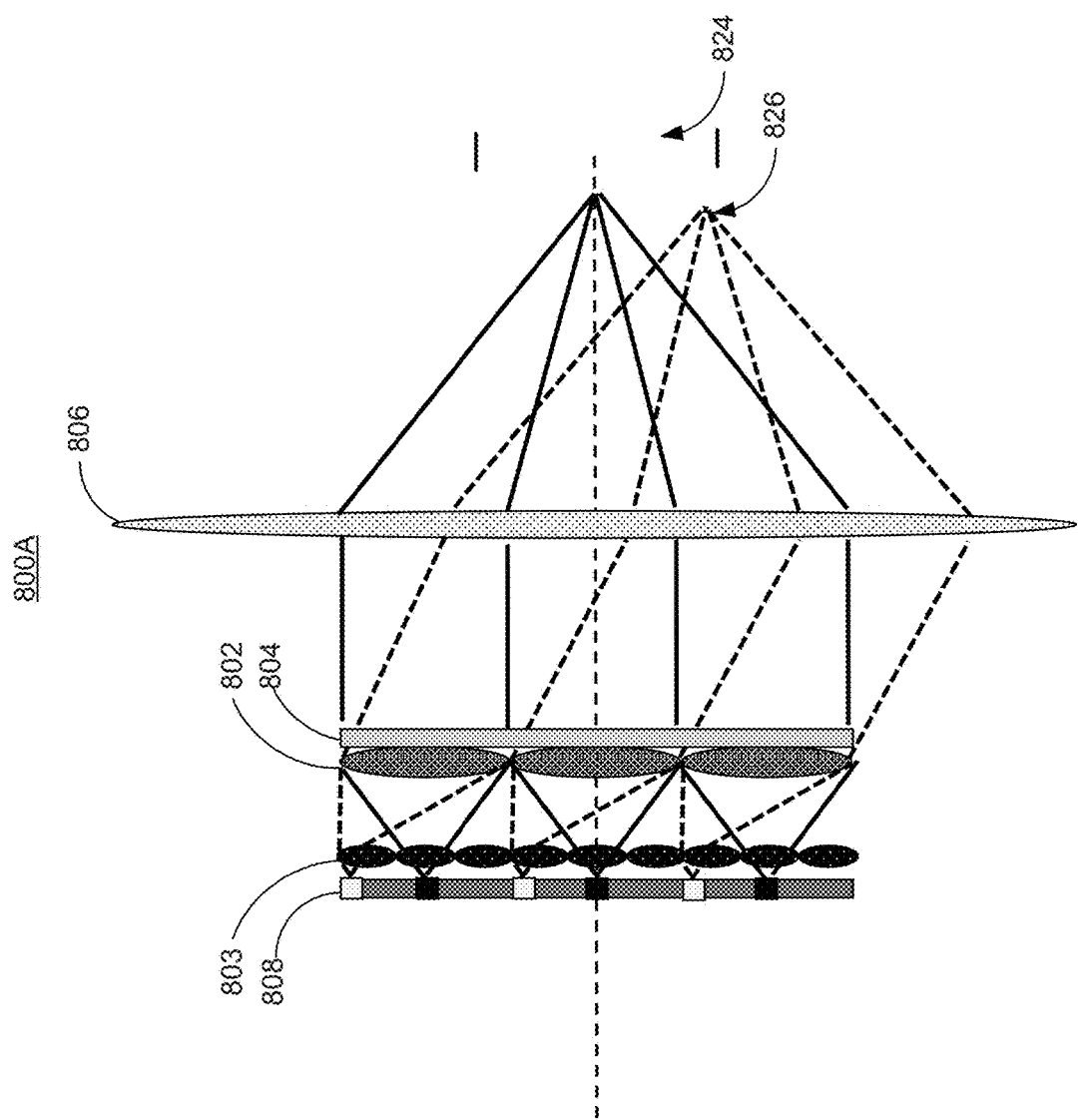

LIGHT FIELD DIRECTIONAL BACKLIGHTING BASED THREE-DIMENSIONAL (3D) PUPIL STEERING

CROSS REFERENCE TO RELATED APPLICATIONS

This patent application claims the benefit of U.S. Provisional Patent Application Ser. No. 63/398,384 filed on Aug. 16, 2022. The disclosures of the above application are hereby incorporated by reference for all purposes.

TECHNICAL FIELD

This patent application relates generally to techniques for display image rendering and processing, and more specifically, to systems and methods for performing pupil steering using a micro lens array (MLA) based light field directional backlighting.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to form a first image and a second image, and with these images, to generate "binocular" vision for viewing by a user. Head-mounted display (HMD) devices may compromise on eye box size to maintain performance and/or improve light efficiency, necessitating a means for steering the eye box to maintain alignment with a moving eye. Pupil steering methods are dependent on mechanically moving the pupil steering component or moving the whole display module. Otherwise, only two-dimensional (2D) adjustment of the pupil position may be provided, further introducing additional image quality degradation.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIGS. 8A and 8B illustrate two different configurations of a dual micro lens array (MLA) based light field directional backlighting system, according to some examples.

DETAILED DESCRIPTION

Figure 1:
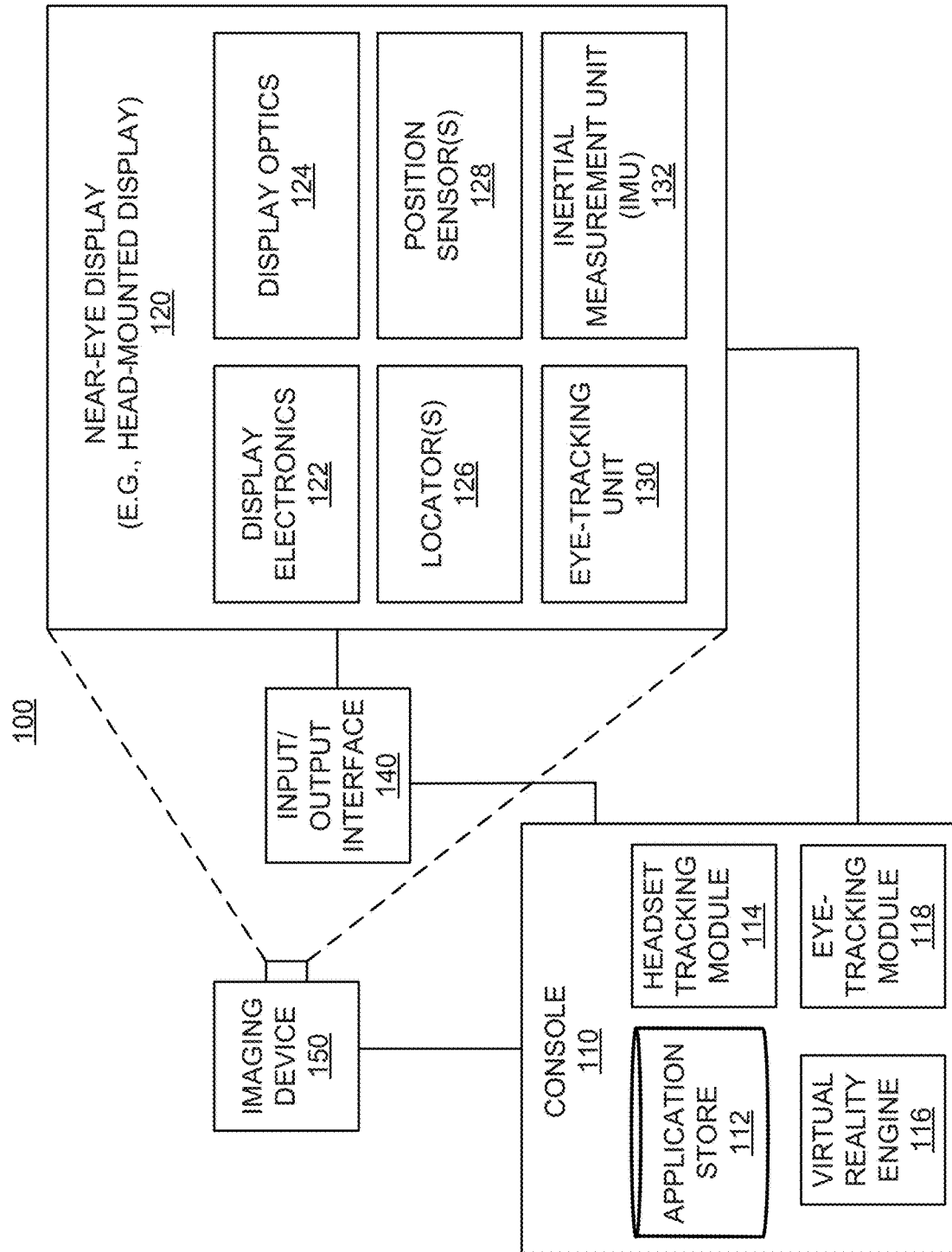
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Virtual reality (VR) and augmented reality (AR) displays may offer a significantly wider field of view (FOV) than traditional displays, creating an immersive experience for a user. However, light efficiency in a head-mounted display (HMD) may be insufficient due to pupil movements. To increase light efficiency, pupil steering or steering the eye box to maintain alignment with a moving eye may be performed. Conventional pupil steering methods typically include mechanical movement of one or more display system components, or they may provide two-dimensional adjustment of the pupil position only resulting in image quality degradation.

In some examples of the present disclosure, light field directional backlighting is employed to provide three-dimensional (3D) pupil steering without mechanical adjustment while maintaining a compact form factor and performance. An example light field directional backlighting unit may include two substantially flat components: an array of light source (e.g., a light emitting diode (LED) array, a liquid crystal display (LCD), a micro light emitting diode (µLED) array, a micro-organic light emitting diode (µOLED) panel, and similar ones) and an array of modulators (e.g., a micro lens array (MLA), a stack of transmissive display elements, a pinhole array, and similar ones). By digitally modifying the illumination pattern on the array of light source and pairing the light field directional backlighting unit to an extra transmissive display element (e.g., a liquid crystal display "LCD") as the main display panel and one or more viewing optical elements, a light field created by the light field directional backlighting unit may be moved in three-dimensional (3D) space to correspond to pupil shift without interfering with the display content.

While some advantages and benefits of the present disclosure are apparent, other advantages and benefits may include pupil steering along multiple axes (three-dimensional (3D) space), thinner stack of elements compared to conventional systems allowing reduced weight and size, lower power consumption compared to mechanical approaches, and increased efficiency through directed and enhanced brightness.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eyebox, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular HMD) or both eyes (for binocular HMDs). Also, as used herein, an "eyebox" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eyebox.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a HMD, a pair of glasses, or other similar wearable eyewear or device. Examples of the near-eye display 120 are further described below with respect to FIGS. 2 and 3. Additionally, in some examples, the functionality described herein may be used in a HMD or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye-tracking unit 130. In some examples, the near eye display 120 may also include one or more locators 126, one or more position sensors 128, and an inertial measurement unit (IMU) 132. In some examples, the near-eye display 120 may omit any of the eye-tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (I M U) 132, internal to the inertial measurement unit (I M U) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye-tracking unit 130 may include one or more eye-tracking systems. As used herein, "eye tracking" may refer to determining an eye's position or relative position, including orientation, location, and/or gaze of a user's eye. In some examples, an eye-tracking system may include an imaging system that captures one or more images of an eye and may optionally include a light emitter, which may generate light that is directed to an eye such that light reflected by the eye may be captured by the imaging system. In other examples, the eye-tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye-tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye-tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye-tracking module 118. Based on the received information, the virtual reality engine 116 may determine content to provide to the near-eye display 120 for presentation to the user.

In some examples, the eye-tracking module 118 may receive eye-tracking data from the eye-tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye-tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

In some examples, the eye-tracking module 118 may track a position of the user's pupil. The display optics electronics 122 and the display optics 124 may include a light emitting diode (LED) array, a micro lens array (MLA), a transmissive display element, and an optical or virtual reality (VR) lens (in order of stacking). The eye-tracking module 118 or the virtual reality engine 116 may control operation of the light emitting diode (LED) array activating individual light emitting diodes (LEDs) or groups of light emitting diodes (LEDs) such that the light field is created tracking the pupil. By using a two-dimensional (2D) light emitting diode (LED) array and micro lens array (MLA), the pupil steering may be achieved in three-dimensional space.

Figure 2:
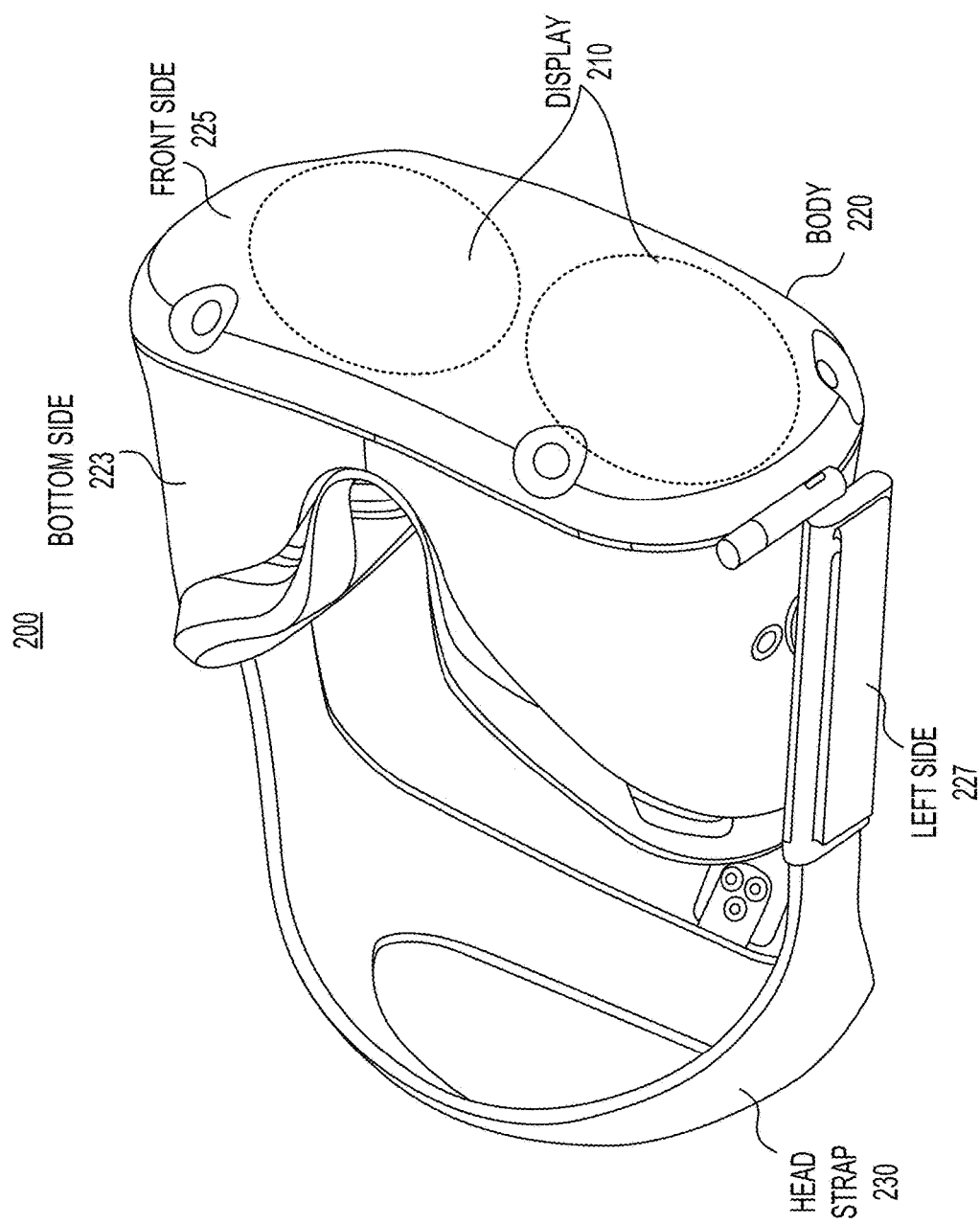
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the HMD device 200 may be a part of a virtual reality (VR) system, an augmented reality (AR) system, a mixed reality (MR) system, another system that uses displays or wearables, or any combination thereof. In some examples, the HMD device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the HMD device 200 for allowing a user to mount the HMD device 200 onto the user's head. For example, the length of the head strap 230 may be adjustable to accommodate a range of user head sizes. In some examples, the HMD device 200 may include additional, fewer, and/or different components.

In some examples, the HMD device 200 may present to a user, media or other digital content including virtual and/or augmented views of a physical, real-world environment with computer-generated elements. Examples of the media or digital content presented by the HMD device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the HMD device 200.

In some examples, the HMD device 200 may include various sensors (not shown), such as depth sensors, motion sensors, position sensors, and/or eye tracking sensors. Some of these sensors may use any number of structured or unstructured light patterns for sensing purposes. In some examples, the HMD device 200 may include an input/output interface 140 for communicating with a console 110, as described with respect to FIG. 1. In some examples, the HMD device 200 may include a virtual reality engine (not shown), but similar to the virtual reality engine 116 described with respect to FIG. 1, that may execute applications within the HMD device 200 and receive depth information, position information, acceleration information, velocity information, predicted future positions, or any combination thereof of the HMD device 200 from the various sensors.

In some examples, the information received by the virtual reality engine 116 may be used for producing a signal (e.g., display instructions) to the one or more display assemblies. In some examples, the HMD device 200 may include locators (not shown), but similar to the virtual locators 126 described in FIG. 1, which may be located in fixed positions on the body 220 of the HMD device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

In some examples, display(s) 210 may be positioned inside the body 220 and present to the user the media or other digital content including virtual and/or augmented views of a physical, real-world environment with computer-generated elements. The display 210 may improve light efficiency by steering the eye box to maintain alignment with a moving eye through light field directional backlighting. The display 210 may include a stack of optical elements including one or more micro lens arrays (MLAs) and achieve pupil steering through activation of different light emitting diodes (LEDs) in an LED array acting as light source.

Figure 3:
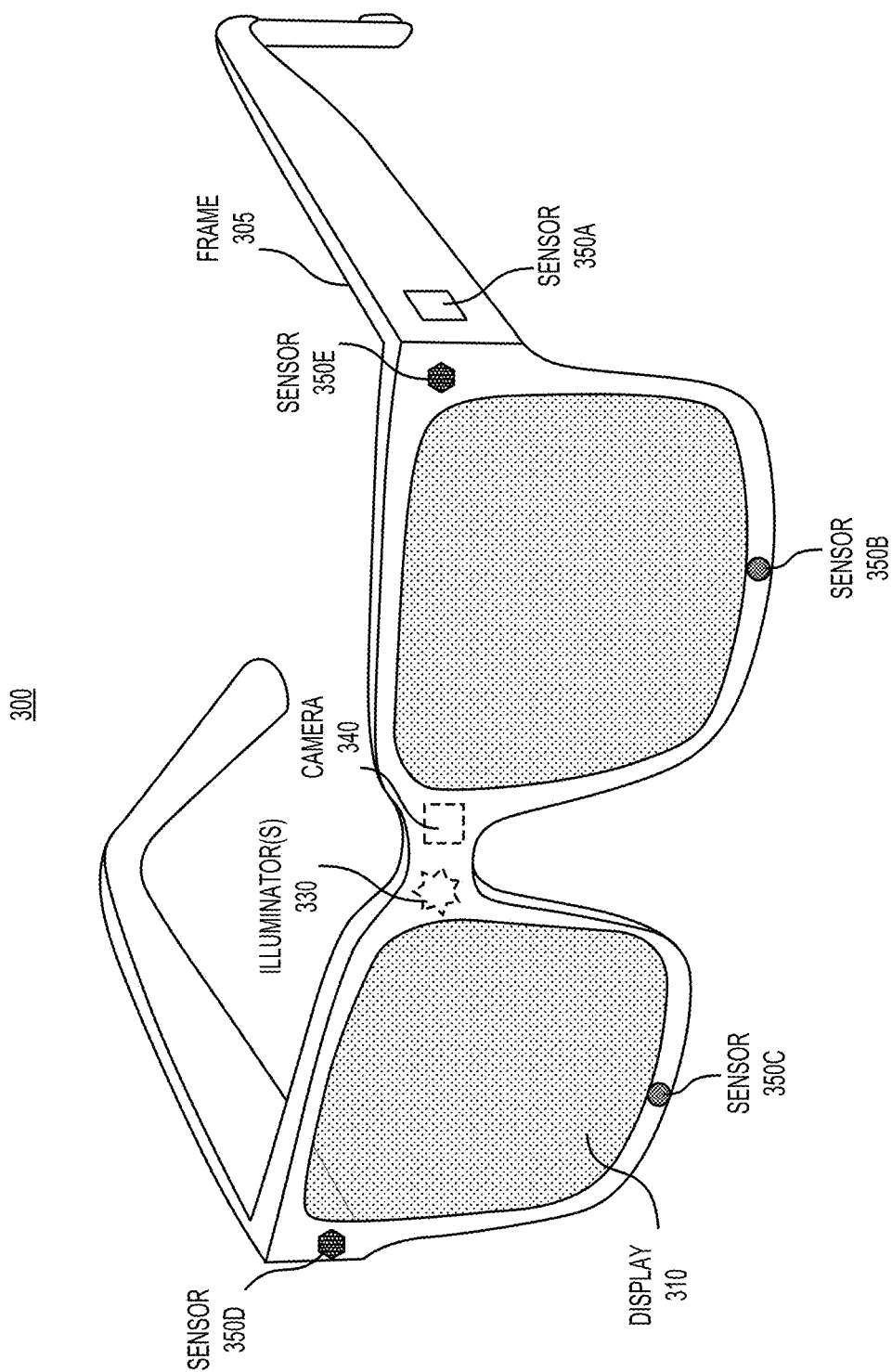
FIG. 3 illustrates a perspective view of a near-eye display in the form of a pair of glasses, according to an example.

FIG. 3 illustrates a perspective view of a near-eye display 300 in the form of a pair of glasses (or other similar eyewear), according to an example. In some examples, the near-eye display 300 may be a specific example of near-eye display 120 of FIG. 1 and may be configured to operate as a virtual reality display, an augmented reality (AR) display, and/or a mixed reality (MR) display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. The display 310 may also include one or more micro lens arrays (MLAs) to provide non-mechanical light field directional backlighting.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some/examples, the various sensors 350a-350e may be used as input devices to control or influence the displayed content of the near-eye display 300, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications.

Figure 4:
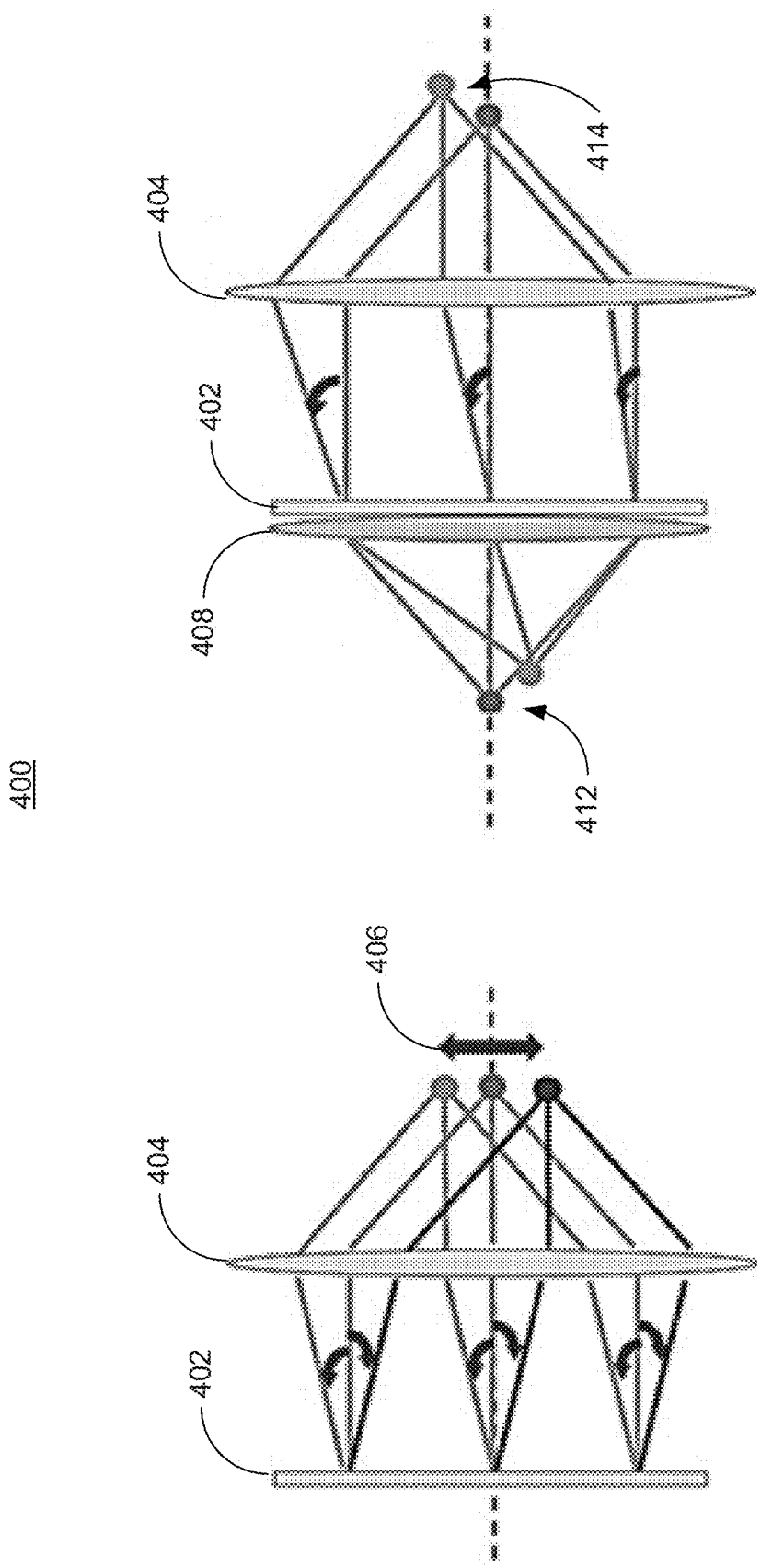
FIG. 4 illustrates directional backlighting for pupil steering.

FIG. 4 illustrates directional backlighting for pupil steering. Diagram 400 shows a display system with a display 402 with directional backlighting and a virtual reality (VR) (optical) lens 404 to focus light from the display 402 onto an eyebox 406 taking into account pupil shift (in one dimension).

Some pupil steering systems may utilize an image projector to form an artificial image (e.g., a computer-generated image) on an image plane and a deflector located at or near the image plane to deflect incident light from the image to a corresponding direction based on a location of a pupil of the user's eye. A relay subsystem may relay the image deflected by the deflector to an eye box. The deflector may be steerable mechanically by a micro-electro-mechanical system (MEMS), for example.

Directional backlighting is an in-display pupil steering technique that tunes an emission angle out of the display panel to achieve pupil steering. In-display pupil steering may not interfere with the ray path through the viewing optical elements to the user's eye. As mentioned above, one way to achieve pupil steering 414 may be to combine mechanically translated illumination source point or array of source points (412), a projection lens 408, and a transmissive display element (the display 402). As any mechanical components may result in additional power consumption and may degrade a reliability of the near-eye display device, mechanical pupil steering systems may not be an optimal approach to pupil steering challenges.

Figures 5A, 5B:
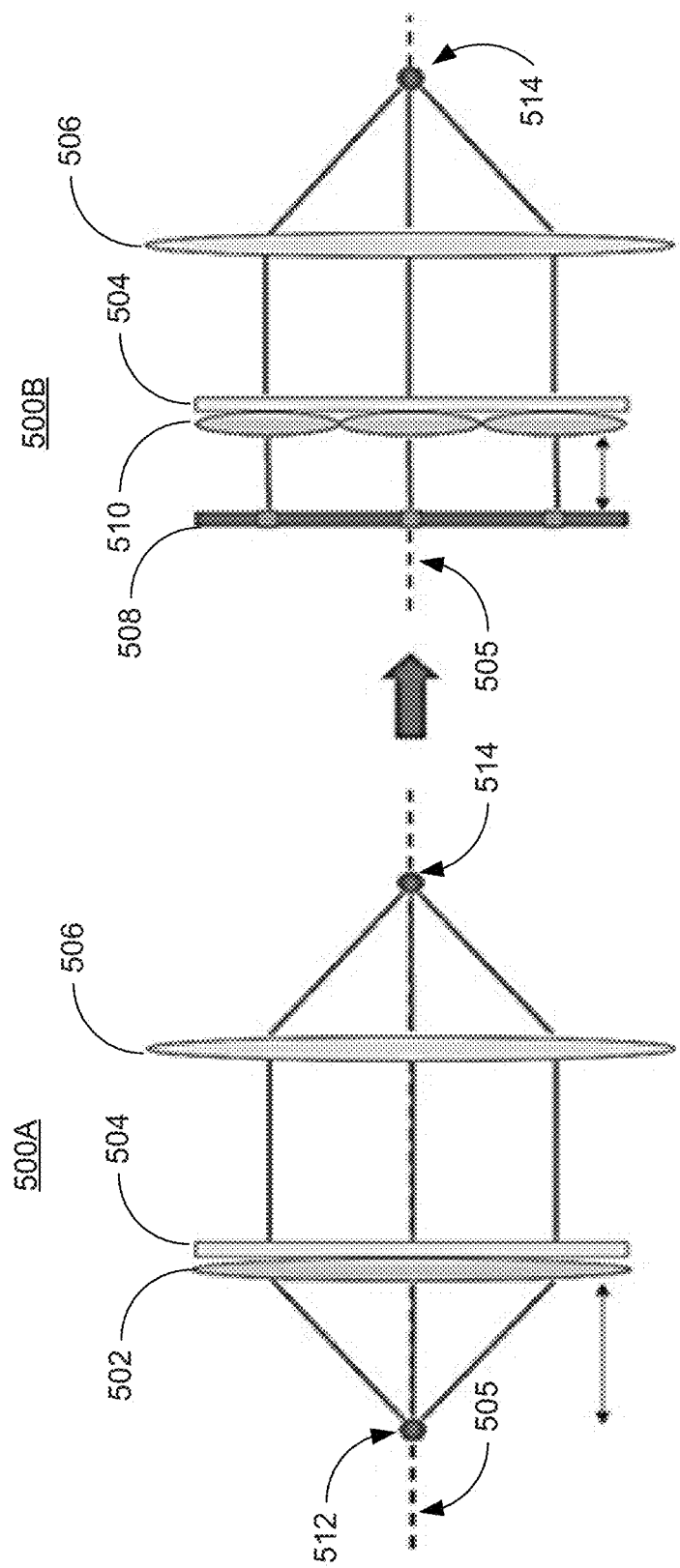
FIGS. 5A and 5B illustrate a comparison of a directional backlighting system and a micro lens array (MLA) based light field directional backlighting system, according to an example.

FIGS. 5A and 5B illustrate a comparison of a directional backlighting system and a micro lens array (MLA) based light field directional backlighting system, according to an example. Diagram 500A shows a light field backlighting system, where a light field may be created through a projection lens 502 and transmissive display element 504. A virtual reality (VR) lens 506 may focus the light from an illumination source point 512 at a pupil position 514 with a focal length, $f_{proj}$, of the projection lens 502 being about equal to a distance between the illumination source point 512 and a center of the projection lens 502. Diagram 500B shows a micro lens array (MLA) based light field directional backlighting system with a light emitting diode (LED) array 508, micro lens array (MLA) 510, transmissive display element 504, and virtual reality (VR) lens 506. In the micro lens array (MLA) based system, the micro lens array (MLA) and transmissive display element together create the light field at the pupil position 514. The light emitting diode (LED) array 508 may be placed at the focal length, $f_{MLA}$, of the micro lens array (MLA) 510.

In some examples, the light emitting diode (LED) array 508, the micro lens array (MLA) 510, the transmissive display element 504, and the virtual reality (VR) lens 506 may be axially aligned along an orthogonal axis 505 of the same components. The axial alignment may allow light beams passing through the optical stack (generated by the light emitting diode (LED) array 508 to preserve their positions relative to each other. A micro lens array (MLA) based light field directional backlighting may recreate the light field of the illumination source point 512 and the projection lens 502 using the light emitting diode (LED) array 508 and the micro lens array (MLA) 510. The light field of the illumination may be created through various techniques such as a stack of transmissive display elements in addition to using the micro lens array (MLA) 510.

By using the micro lens array (MLA) 510, a total thickness of a directional backlighting module that includes the light emitting diode (LED) array 508, the micro lens array (MLA) 510, the transmissive display element 504, and the virtual reality (VR) lens 506 may be significantly reduced. A focal length of the lenslets ($f_{MLA}$) of the micro lens array (MLA) 510 may be much smaller compared to a focal length ($f_{proj}$) of the relatively large projection lens 504.

In some examples, individual light emitting diodes (LEDs) or groups of light emitting diodes (LEDs) in the light emitting diode (LED) array 508 may be activated or deactivated for local dimming. Some transmissive display elements may not be able to block light (specifically, in augmented reality (AR) applications), which may result in virtual objects appearing partially transparent. Local dimming may allow blocking of light from the real environment to allow better display of superimposed virtual objects. For example, to achieve higher dynamic range of the light field direction backlighting, if black color is to be displayed in any portion of the presented content, corresponding light emitting diodes (LEDs) may be deactivated. Through the selective activation and deactivation of the light emitting diodes (LEDs), further power consumption savings may also be obtained.

Figure 5D:
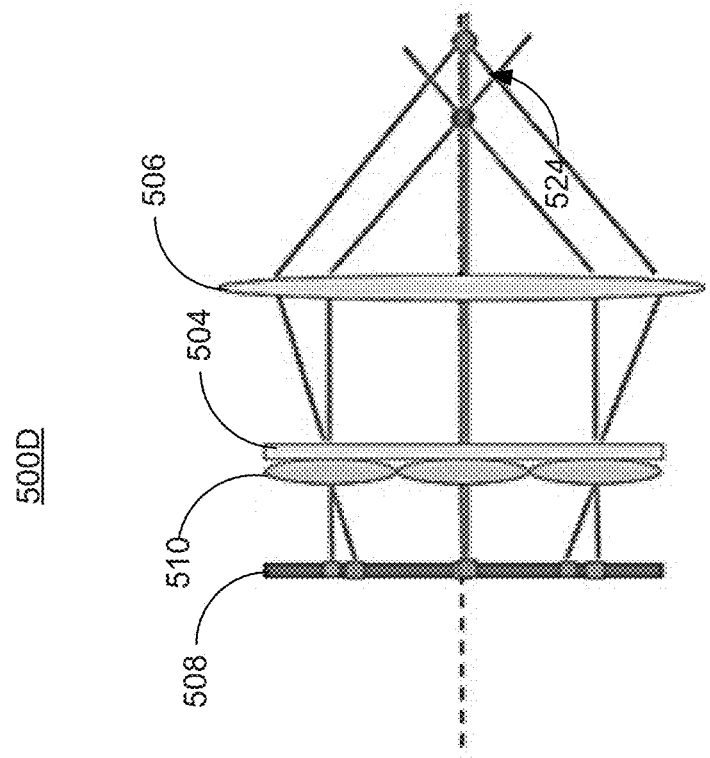
FIGS. 5C and 5D illustrate lateral pupil shift and axial pupil shift accommodation in a micro lens array (MLA) based light field directional backlighting system, according to an example.
Figure 5C:
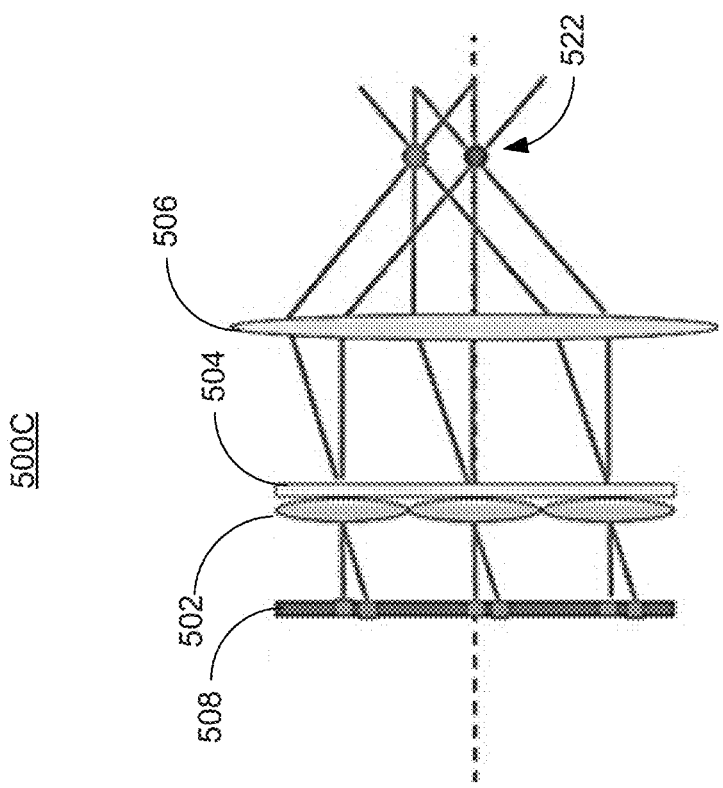

FIGS. 5C and 5D illustrate lateral pupil shift and axial pupil shift accommodation in a micro lens array (MLA) based light field directional backlighting system, according to an example. Diagram 500C shows lateral pupil shift 522 being accommodated by turning on (activating) different light emitting diodes (LEDs) in the light emitting diode (LED) array 508 and using the micro lens array (MLA) 510 and the virtual reality (VR) lens 506. Diagram 500D shows axial pupil shift 524 (in an orthogonal direction to the lateral pupil shift 522) being accommodated by turning on (activating) different light emitting diodes (LEDs) in the light emitting diode (LED) array 508 and using the micro lens array (MLA) 510 and the virtual reality (VR) lens 506.

In some examples, two plane arrays (the light emitting diode (LED) array 508 and the micro lens array (MLA) 510) may recreate the three-dimensional (3D) light field of the illumination by selectively turning on the light emitting diodes (LEDs) on the light emitting diode (LED) array 508 so that three-dimensional (3D) pupil steering may be achieved without using a three-dimensional (3D) array or mechanically translating the components.

Figure 6:
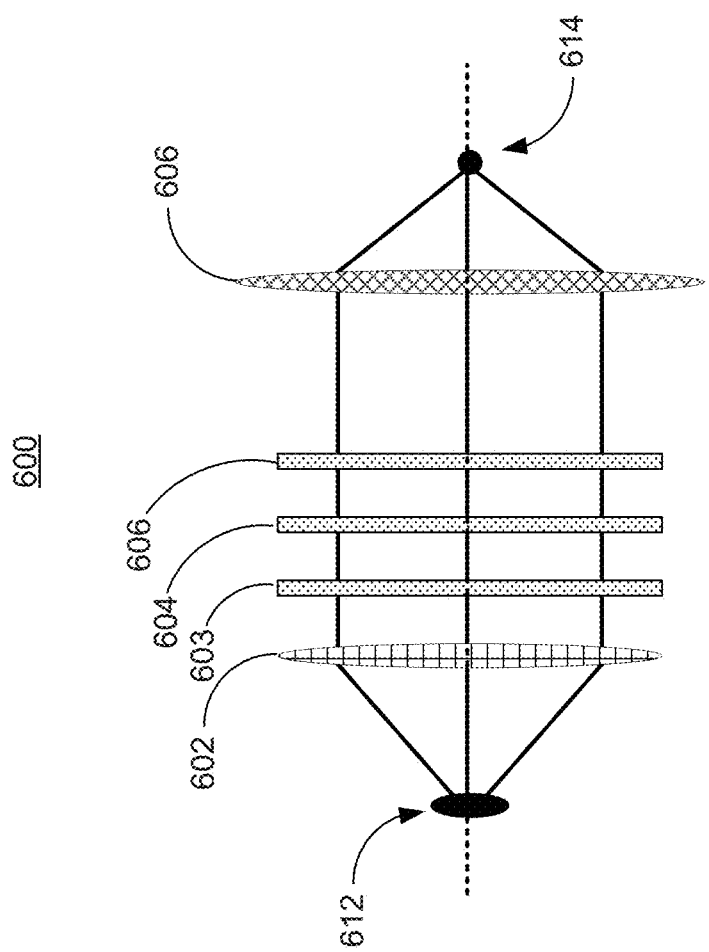
FIG. 6 illustrates a transmissive display stack based light field directional backlighting system, according to an example.

FIG. 6 illustrates a transmissive display stack based light field directional backlighting system, according to an example. Diagram 600 shows a light field directional backlighting system that includes projection lens 602, first transmissive display element 603, second transmissive display element 604, third transmissive display element 606, and virtual reality (VR) lens 606 for creating the directional light field of the illumination source 612 at a pupil position 614. Thus, by selectively turning on and off the pixels on the transmissive displays, a small pupil may be created on the pupil position side.

In some examples, the light field of the illumination source may be created through other techniques such as a stack of transmissive display elements as shown in diagram 600. A number of transmissive display elements may be selected based on display system characteristics such as size, weight, focal lengths, etc. Thus, two or more transmissive display elements may be used in the system. A practical range for the number of transmissive display elements may be between 2 and 5 in some implementations.

The light field directional backlighting systems discussed herein provide three-dimensional (3D) pupil steering functionality without mechanical adjustment and while maintaining a compact form factor and performance. The two flat components of an example light field directional backlighting system may include an array of light sources (e.g., a liquid crystal display (LCD), a micro light emitting diode array (μLED array), a micro-organic light emitting diode panel (μOLED panel), etc.) and an array of modulators (e.g., a micro lens array (MLA), a stack of transmissive display elements, or a pinhole array).

Figure 7B:
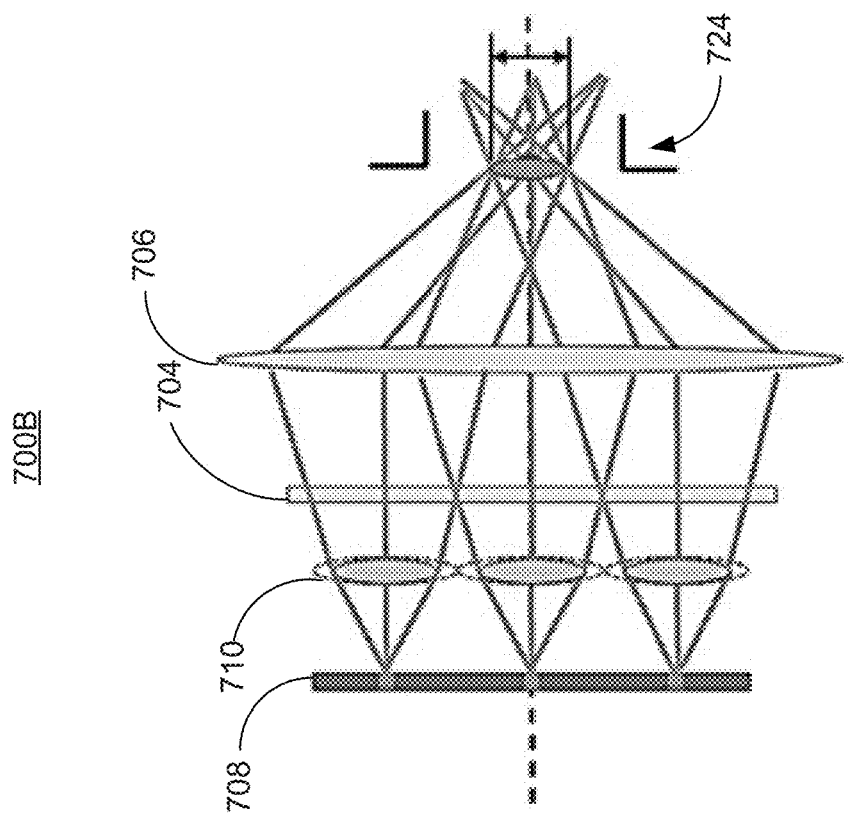
FIGS. 7A and 7B illustrate a fill factor in a micro lens array (MLA) based light field directional backlighting system and increase of the footprint on the liquid crystal display (LCD) through shifting of the micro lens array (MLA), according to an example.
Figure 7A:
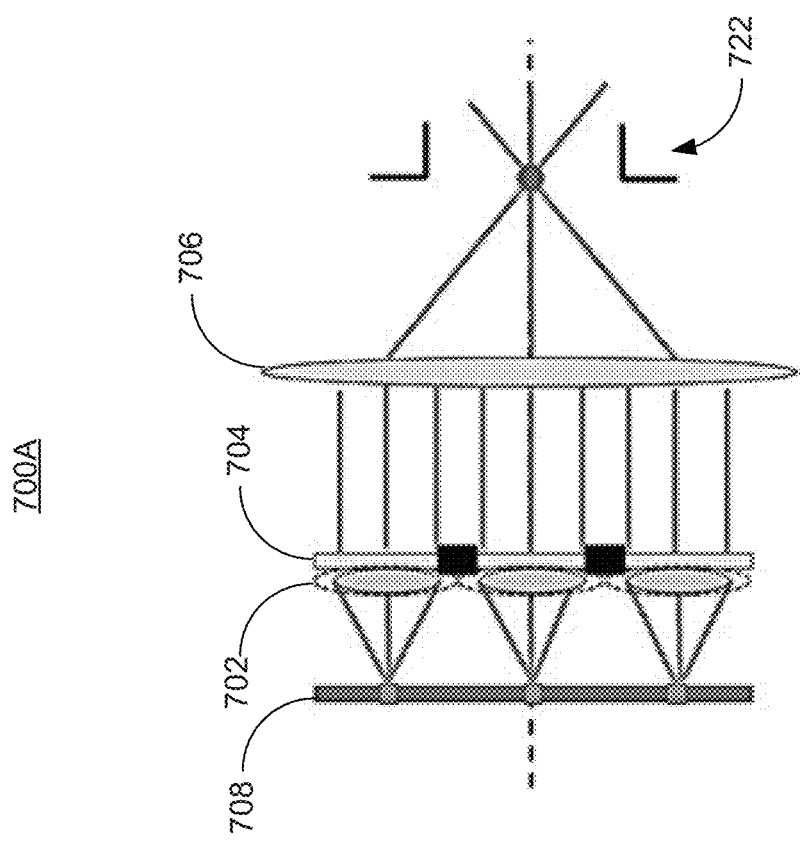

FIGS. 7A and 7B illustrate a fill factor in a micro lens array (MLA) based light field directional backlighting system and increase of the footprint on the liquid crystal display (LCD) through shifting of the micro lens array (MLA), according to an example. Diagram 700A shows a typical light emitting diode (LED) array-micro lens array (MLA)-transmissive display element configuration with a light emitting diode (LED) array 708, a micro lens array (MLA) 702, and a transmissive display element 704, along with virtual reality (VR) lens 706 creating a light field at an eye box 722. As indicated by the black squares, a fill factor of the micro lens array (MLA) 702 may not reach 100% resulting in some light loss. Diagram 700B shows a modified configuration, where a micro lens array (MLA) 710 is placed away from the transmissive display element 704 and closer to the light emitting diode (LED) array 708. The distancing of the micro lens array (MLA) 710 from the transmissive display element 704 may increase the fill factor and allow more light to be focused by the virtual reality (VR) lens 706 at the eye box 724. In some implementations, a distance between the light emitting diode (LED) array 708 and the micro lens array (MLA) 702 may be in a range from about 3 mm to about 5 mm.

A fill factor of a micro lens array (MLA) is the ratio of the lenslets' light sensitive area to their total area. The fill factor of the micro lens array (MLA) may not reach the theoretical value (100%). Thus, some of pixels on the transmissive display element 704 (e.g., a liquid crystal display "LCD") may not be illuminated. By shifting the micro lens array (MLA) 710 away from the transmissive display element 704 a footprint of illumination on the transmissive display element 704 may be increased for each lenslet of the micro lens array (MLA).

In some examples, a combination of a Pancharatnam-Berry phase (PBP) lens and a holographic optical element (HOE) may be used in place of the micro lens array (MLA) to achieve near 100% fill factor. A Pancharatnam-Berry phase (PBP) lens may be activated as a convex lens or a concave lens according to a polarization state of the input light wave allowing construction of a thin optical element with a large numerical aperture (NA). A holographic optical element (HOE), which diffracts light rays with different profiles according to the input wavelength, may be used to mitigate chromatic aberrations caused by the Pancharatnam-Berry phase (PBP) lens. Holographic optical elements (HOEs) may include, but are not limited to mirrors, lenses, directional diffusers, and similar optical elements. The combination of the combination of a Pancharatnam-Berry phase (PBP) lens and a holographic optical element (HOE) may provide a wider field of view (FOV), thus a higher fill factor.

Figure 8B:
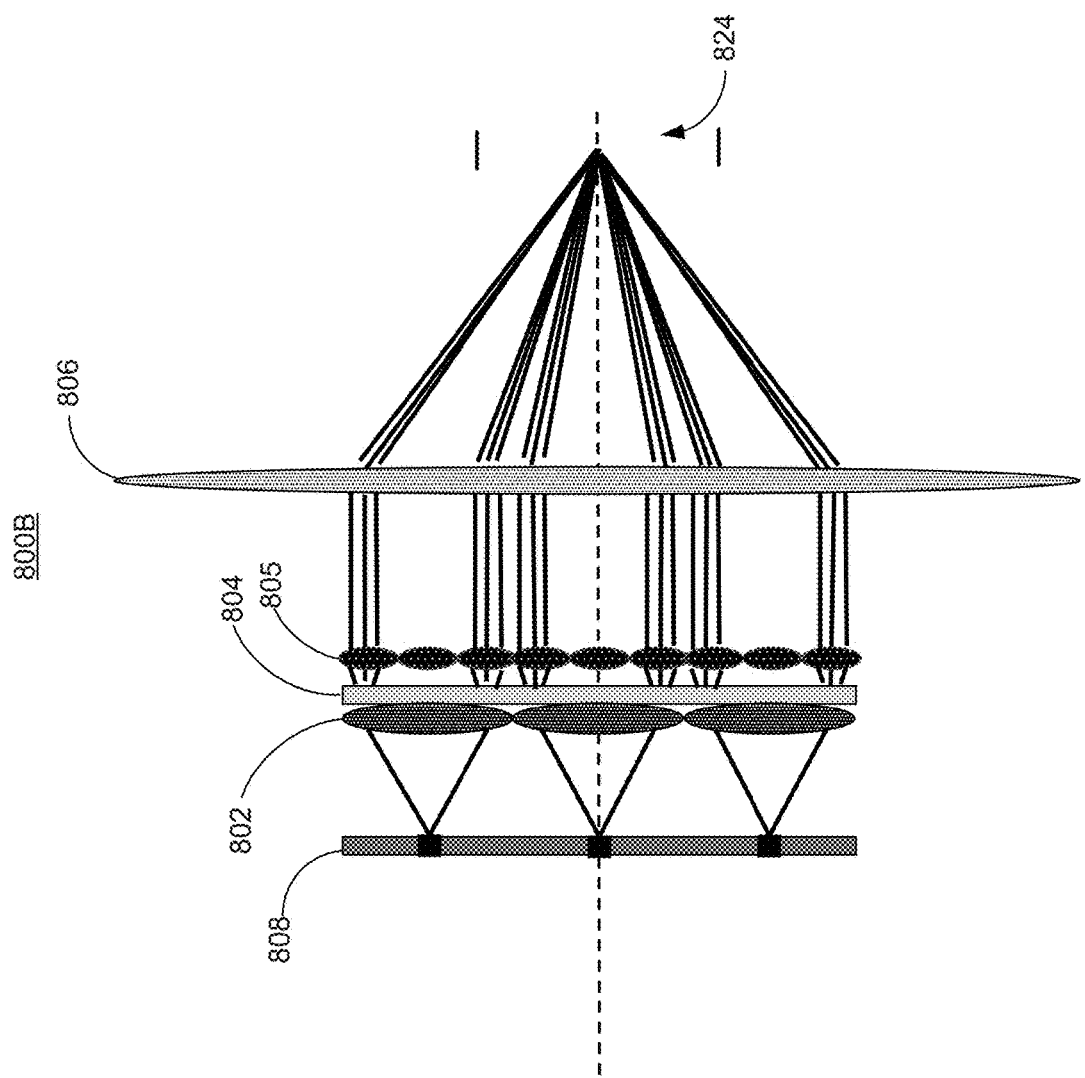

FIGS. 8A and 8B illustrate two different configurations of a dual micro lens array (MLA) based light field directional backlighting system, where each configuration has two MLAs but the relative location of the second MLA changes in the two different configurations, according to some examples. Diagram 800A shows light emitting diode (LED) array 808, first micro lens array (MLA) 802, second micro lens array (MLA) 803, transmissive display element 804, and virtual reality (VR) lens 806 creating the light field for eye box 824. The lenslets of the second micro lens array (MLA) 803 may be smaller compared to the first micro lens array (MLA) 802.

In diagram 800A, the first micro lens array (MLA) 802 corresponds to the micro lens array (MLA) 510 in FIG. 5A for diffracting incoming light rays toward the eye box (for further diffraction by the virtual reality (VR) lens). In some examples, the second micro lens array (MLA) 803 may be placed closer to the light emitting diode (LED) array 808 and steer the light beam(s) from the edge(s) of the light emitting diode (LED) array 808 toward the first micro lens array (MLA) 802 to further improve an efficiency for an off-axis pupil position 826. While the second micro lens array (MLA) 803 is shown with lenslets about three times smaller compared to the lenslets of the first micro lens array (MLA) 802 in diagram 800A, example implementations are not limited to a three-fold difference. A size difference between the lenslets of the first micro lens array (MLA) 802 and the lenslets of the second micro lens array (MLA) 803 may be selected based on configuration of the light field directed backlighting system. In some implementations, the second micro lens array (MLA) 803 may be positioned as close as practically possible after the light emitting diode (LED) array 808.

Diagram 800B of FIG. 8B shows light emitting diode (LED) array 808, first micro lens array (MLA) 802, a second micro lens array (MLA) 805 located in a different relative position than the second MLA 803 in FIG. 8A, transmissive display element 804, and virtual reality (VR) lens 806 creating the light field for eye box 824. The lenslets of the second micro lens array (MLA) 805 may be smaller compared to the first micro lens array (MLA) 802.

In diagram 800B of FIG. 8B, the light emitting diode (LED) 808 and the first micro lens array (MLA) 802 are configured similar to the light emitting diode array 508 and the micro lens array (MLA) 510 in FIG. 5A for diffracting incoming light rays toward the eye box (for further diffraction by the virtual reality (VR) lens). In some examples, the second micro lens array (MLA) 805 may be placed on the opposite side of the transmissive display element 804 (compared to the first micro lens array (MLA) 802) to converge light beams diffracted by the transmissive display element 804 pixels so that the light beams may still converge to a small point in the eye box 824. While the second micro lens array (MLA) 805 is shown with lenslets about three times smaller compared to the lenslets of the first micro lens array (MLA) 802 in diagram 800B, example implementations are not limited to a three-fold difference. A size difference between the lenslets of the first micro lens array (MLA) 802 and the lenslets of the second micro lens array (MLA) 805 may be selected based on configuration of the light field directed backlighting system. In some implementations, a distance between the second micro lens array (MLA) 805 and the transmissive display element 804 may be in a range from a few micrometers (e.g., 2) to tens of micrometers (e.g., 30).

Figure 9:
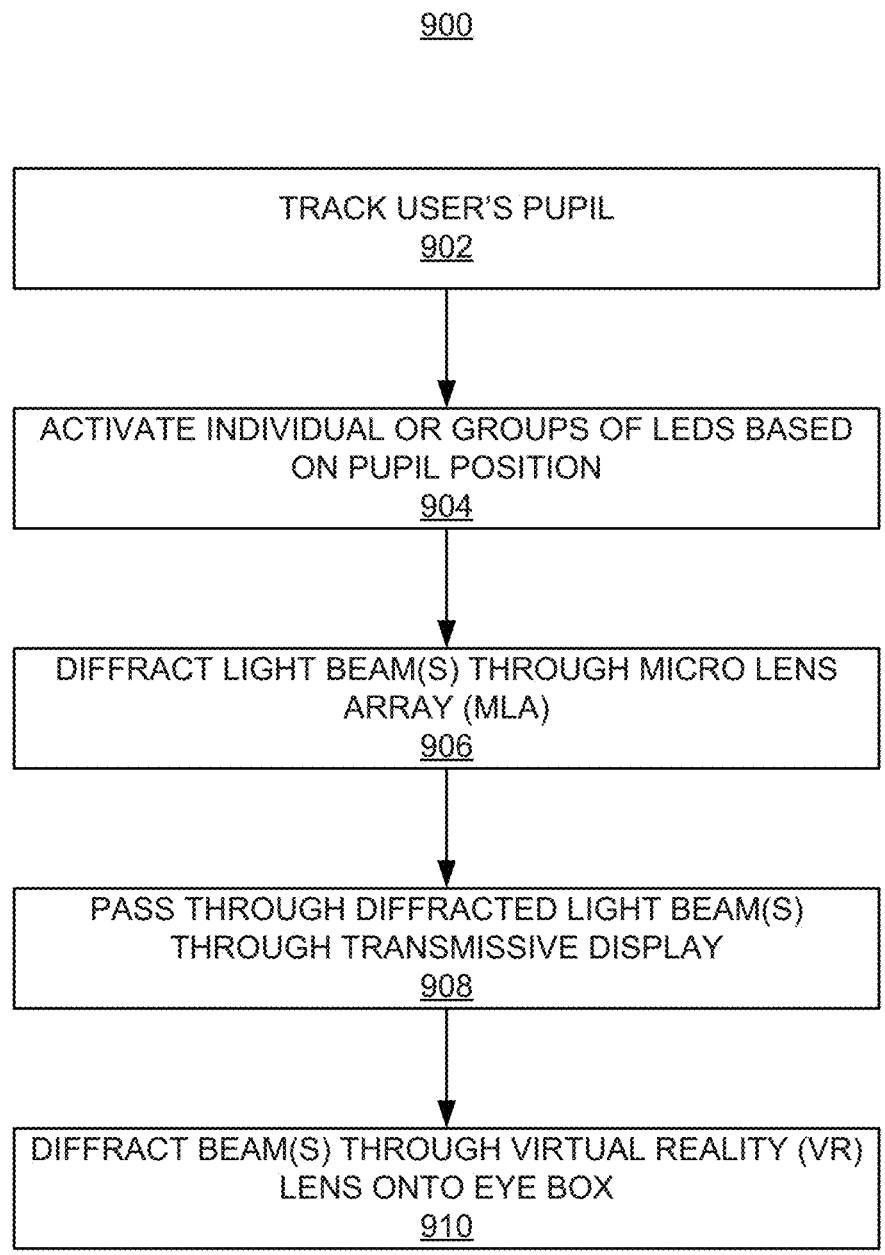
FIG. 9 illustrate a flow diagram of a method for using a micro lens array (MLA) based light field directional backlighting system, according to some examples.

FIG. 9 illustrates a flow diagram of a method 900 for using a micro lens array (MLA) based light field directional backlighting system, according to some examples. The method 500 is provided by way of example, as there may be a variety of ways to carry out the method described herein. Although the method 900 is primarily described as being performed by the components of FIGS. 1 and 5B, the method 900 may be executed or otherwise performed by one or more processing components of another system or a combination of systems. Each block shown in FIG. 9 may further represent one or more processes, methods, or sub-routines, and one or more of the blocks (e.g., the selection process) may include machine readable instructions stored on a non-transitory computer readable medium and executed by a processor or other type of processing circuit to perform one or more operations described herein.

At block 902, the eye-tracking module 118 of the console 110 or the eye-tracking unit 130 in the near-eye display 120 may track a position of the user's pupil. At block 904, the pupil's tracked position may be used to activate individual or groups of light emitting diodes (LEDs) such that diffracted light beams can be focused on the tracked position of the pupil. Through the use of a two-dimensional (2D) light emitting diode (LED) array 508 and a two-dimensional (2D) micro lens array (MLA) 510, the light field for the tracked pupil may be created in three-dimensional (3D) space.

At block 906, light beam(s) from the activated light emitting diodes (LEDs) of the light emitting diode (LED) array 508 may be diffracted by the micro lens array (MLA) 510. At block 908, the light beam(s) diffracted by the micro lens array (MLA) 510 may be passed through by the transmissive display element 504. At block 910, the light beam(s) from the transmissive display element 504 may be diffracted and focused by the virtual reality (VR) lens 506 onto the eye box to match a tracked position of the pupil (514).

According to examples, a method of making a micro lens array (MLA) based light field directional backlighting system is described herein. A system of making the micro lens array (MLA) based light field directional backlighting system is also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A head-mounted display (HMD) device, comprising:
   a two-dimensional (2D) light emitting diode (LED) array;
   a micro lens array (MLA) axially aligned with the two-dimensional (2D) light emitting diode (LED) array;
   a transmissive display element axially aligned with the micro lens array (MLA); and
   an optical lens axially aligned with the transmissive display element, wherein individual light emitting diodes (LEDs) of the two-dimensional (2D) light emitting diode (LED) array are selectively activated for three-dimensional (3D) pupil steering at an eye box receiving focused light beams from the optical lens,
   wherein the micro lens array (MLA) is placed at a predefined distance from the transmissive display element to increase a footprint of illumination for each lenslet of the micro lens array (MLA) on the transmissive display element.

2. The head-mounted display (HMD) device of claim 1, wherein the two-dimensional (2D) light emitting diode (LED) array is at about a focal length ($f_{MLA}$) of the micro lens array (MLA).

3. The head-mounted display (HMD) device of claim 1, wherein one or more individual light emitting diodes (LEDs) or one or more groups of light emitting diodes (LEDs) of the two-dimensional (2D) light emitting diode (LED) array are activated or deactivated for local dimming.

4. The head-mounted display (HMD) device of claim 1, further comprising:
a Pancharatnam-Berry phase (PBP) lens and a holographic optical element (HOE) between the two-dimensional (2D) light emitting diode (LED) array and the transmissive display element to increase a fill factor.

5. The head-mounted display (HMD) device of claim 1, wherein the micro lens array (MLA) is a first micro lens array (MLA), and the apparatus further comprises:
a second micro lens array (MLA) placed between the two-dimensional (2D) light emitting diode (LED) array and the first micro lens array (MLA) to increase an efficiency for an off-axis pupil position.

6. The head-mounted display (HMD) device of claim 5, wherein individual lenslets of the second micro lens array (MLA) are at least three times smaller compared to individual lenslets of the first micro lens array (MLA).

7. The head-mounted display (HMD) device of claim 1, wherein the micro lens array (MLA) is a first micro lens array (MLA), and the apparatus further comprises:
a second micro lens array (MLA) placed between the transmissive display element and the optical lens to converge light beams diffracted by pixels of the transmissive display element.

8. The head-mounted display (HMD) device of claim 7, wherein individual lenslets of the second micro lens array (MLA) are at least three times smaller compared to individual lenslets of the first micro lens array (MLA).

9. The head-mounted display (HMD) device of claim 1, further comprising:
a camera to track a position of a pupil;
a processor to control selective activation of individual light emitting diodes (LEDs) of the two-dimensional (2D) light emitting diode (LED) array based, at least in part, on the tracked position of the pupil such that three-dimensional (3D) pupil steering is achieved at an eye box receiving focused light beams from the optical lens.

10. The head-mounted display (HMD) device of claim 1, wherein the two-dimensional (2D) light emitting diode (LED) array comprises one or more of a light emitting diode (LED) array, a micro light emitting diode (μLED) array, or a micro-organic light emitting diode (μOLED) panel.

11. A head-mounted display (HMD) device, comprising:
a two-dimensional (2D) light emitting diode (LED) array;
a first micro lens array (MLA) axially aligned with the two-dimensional (2D) light emitting diode (LED) array;
a second micro lens array (MLA) placed between the two-dimensional (2D) light emitting diode (LED) array and the first micro lens array (MLA) to increase an efficiency for an off-axis pupil position;
a transmissive display element axially aligned with the first micro lens array (MLA); and
an optical lens axially aligned with the transmissive display element, wherein individual light emitting diodes (LEDs) of the two-dimensional (2D) light emitting diode (LED) array are selectively activated for three-dimensional (3D) pupil steering at an eye box receiving focused light beams from the optical lens.

12. The head-mounted display (HMD) device of claim 11, wherein individual lenslets of the second micro lens array (MLA) are at least three times smaller compared to individual lenslets of the first micro lens array (MLA).

13. The head-mounted display (HMD) device of claim 11, wherein the two-dimensional (2D) light emitting diode (LED) array is at about a focal length ($f_{MLA}$) of the first micro lens array (MLA).

14. The head-mounted display (HMD) device of claim 11, wherein one or more individual light emitting diodes (LEDs) or one or more groups of light emitting diodes (LEDs) of the two-dimensional (2D) light emitting diode (LED) array are activated or deactivated for local dimming.

15. The head-mounted display (HMD) device of claim 11, further comprising:
a camera to track a position of a pupil; and
a processor to control selective activation of individual light emitting diodes (LEDs) of the two-dimensional (2D) light emitting diode (LED) array based, at least in part, on the tracked position of the pupil such that three-dimensional (3D) pupil steering is achieved at an eye box receiving focused light beams from the optical lens.

16. A head-mounted display (HMD) device, comprising:
a two-dimensional (2D) light emitting diode (LED) array;
a first micro lens array (MLA) axially aligned with the two-dimensional (2D) light emitting diode (LED) array;
a second micro lens array (MLA);
a transmissive display element axially aligned with the first micro lens array (MLA); and
an optical lens axially aligned with the transmissive display element,
wherein the second micro lens array (MLA) is placed between the transmissive display element and the optical lens to converge light beams diffracted by pixels of the transmissive display element, and
wherein individual light emitting diodes (LEDs) of the two-dimensional (2D) light emitting diode (LED) array are selectively activated for three-dimensional (3D) pupil steering at an eye box receiving focused light beams from the optical lens.

17. The head-mounted display (HMD) device of claim 16, wherein individual lenslets of the second micro lens array (MLA) are at least three times smaller compared to individual lenslets of the first micro lens array (MLA).

18. The head-mounted display (HMD) device of claim 16, wherein the two-dimensional (2D) light emitting diode (LED) array is at about a focal length ($f_{MLA}$) of the first micro lens array (MLA).

19. The head-mounted display (HMD) device of claim 16, wherein one or more individual light emitting diodes (LEDs) or one or more groups of light emitting diodes (LEDs) of the two-dimensional (2D) light emitting diode (LED) array are activated or deactivated for local dimming.

20. The head-mounted display (HMD) device of claim 16, further comprising:
a camera to track a position of a pupil; and
a processor to control selective activation of individual light emitting diodes (LEDs) of the two-dimensional (2D) light emitting diode (LED) array based, at least in part, on the tracked position of the pupil such that three-dimensional (3D) pupil steering is achieved at an eye box receiving focused light beams from the optical lens.

* * * * *